United States Patent [19]

Arora et al.

[11] Patent Number: 4,634,154
[45] Date of Patent: Jan. 6, 1987

[54] LIGHTWEIGHT INTEGRAL PUP JOINT WITH SPLIT FEMALE SUB

[75] Inventors: Vas D. Arora, Irvine; William A. Gill, El Toro, both of Calif.; Charles L. Patrick, Stephenville, Tex.

[73] Assignee: FMC Corporation, Chicago, Ill.

[21] Appl. No.: 698,663

[22] Filed: Feb. 6, 1985

[51] Int. Cl.⁴ .............................................. F16L 19/02
[52] U.S. Cl. .................................... 285/353; 285/387
[58] Field of Search .............. 285/387, 388, 353, 384, 285/385

[56] References Cited

U.S. PATENT DOCUMENTS

| | | | |
|---|---|---|---|
| 260,966 | 7/1882 | Frey | 285/353 X |
| 473,462 | 4/1892 | Hogan | 285/387 X |
| 498,876 | 6/1893 | Bells | 285/353 X |
| 944,877 | 12/1909 | Koschinski | 285/388 |
| 2,137,137 | 11/1938 | Goldacker | 285/387 X |
| 2,967,068 | 1/1961 | Gressel | 285/388 X |
| 3,428,337 | 2/1969 | Read | 285/387 X |
| 3,679,237 | 7/1972 | De Angelis | 285/387 X |
| 3,984,130 | 10/1976 | Berger et al. | 285/388 X |
| 4,007,953 | 2/1977 | Powell | 285/388 X |
| 4,291,906 | 9/1981 | Donbavand | 285/353 X |
| 4,343,496 | 8/1982 | Petranto | 285/387 X |

Primary Examiner—Thomas F. Callaghan
Attorney, Agent, or Firm—Lloyd B. Guernsey; Henry M. Stanley

[57] ABSTRACT

A lightweight pup joint comprising a length of pipe with male and female union subs on the ends and having integral metallic fluid contacting components. The pipe is formed with a minimum wall thickness required for the intended pressure rating and includes a radially enlarged portion on one end to form a male sub. The other end of the pipe includes a small radial flange sized so a union nut can be moved over the flange. A split female sub is assembled over the flange and held together by a snap ring. An annular sealing member seals gaps between portions of the female sub, seals an interface between the flange and the female sub, and seals a gap between the flange and a male sub of an adjacent pipe. At least one ear on the pipe fits into a slot in the female sub to prevent rotation of the female sub when the union nut is threaded onto the female sub.

3 Claims, 4 Drawing Figures

LIGHTWEIGHT INTEGRAL PUP JOINT WITH SPLIT FEMALE SUB

BACKGROUND OF THE INVENTION

The present invention discloses apparatus for interconnecting two pieces of pipe, and more particularly, apparatus for interconnecting the two pieces of pipe without welding or without threading a union to the ends of the pieces of pipe.

In a variety of industries, such as the oil industry, it is desirable to temporarily connect relatively long length of pipe to carry liquid under high pressure from a source to a sink, such as a petroleum well. This high pressure liquid is often desirable or necessary to subject the well to a treatment procedure in order to stimulate its fluid production. This procedure usually involves the injection of fluid under high pressure, such as several thousand psi to fracture the producing earth formation, or the injection of an acid solution to dissolve or otherwise remove flow obstructing material, thereby increasing the flow of petroleum from the formation into the well.

In order to carry out these well stimulating procedures, it is necessary to temporarily interconnect a relatively large number of pipes to carry the high pressure fluid into the well. Prior art systems use long length of pipe interconnected by pipe unions each having a female sub threaded or welded to the end of a first length of pipe, a male sub threaded or welded to a second length of pipe, and a wing nut which secures the male sub to the female sub. Such a system is expensive and time consuming to construct due to the many sets of threads or the many welds required.

SUMMARY OF THE INVENTION

The present invention eliminates the threads between the female subs and the pipe and eliminates the threads between the male subs and the pipe. The male sub is formed by radially enlarging one end of each length of pipe to form a first annular flange. A second annular flange extends radially outward at a second end of each length of pipe. An internally threaded union nut slips over the second annular flange and is positioned with an axial bore about the pipe and with a shoulder against the first annular flange. A split female sub having external threads is assembled over the second annular flange of an adjacent pipe and the female sub held together by a snap ring. The union nut is threaded onto a female sub of an adjacent pipe to lock the pipes together. An annular sealing member seals gaps between portions of the female sub, seals an interface between the female sub and the second flange and seals a junction between the male sub and the second flange of the adjacent pipe.

DESCRIPTION OF THE PREFERRED EMBODIMENT

Figure 1:
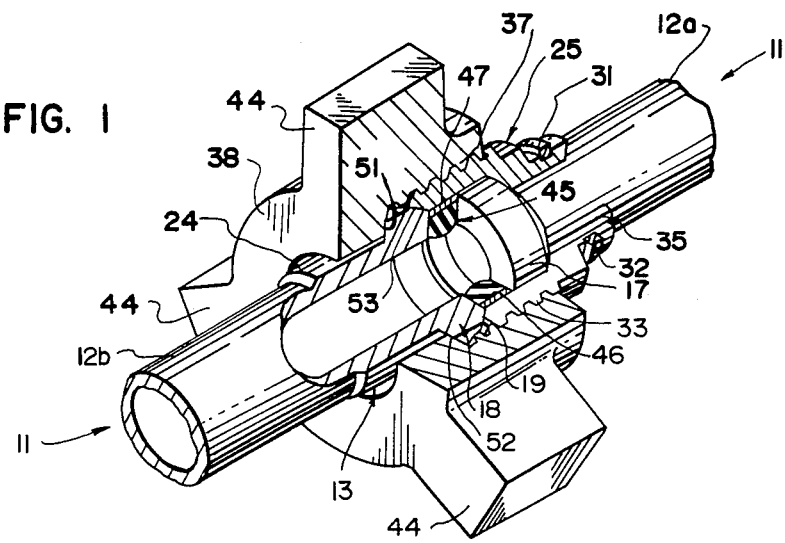
FIG. 1 is an isometric cross-section drawing of two pipes connected together using a pair of pup joints of the present invention.
Figure 4:
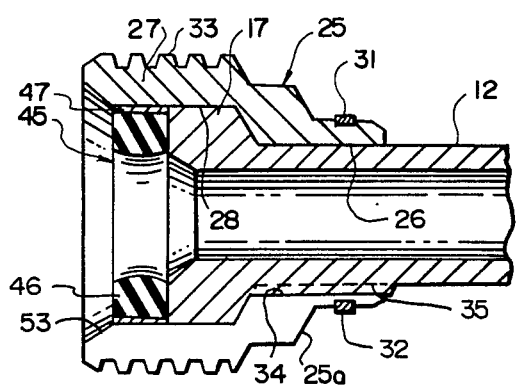
FIG. 4 is a sectional view taken along line 4—4 of FIG. 3.

FIG. 1 discloses the interconnection of a pair of pup joints 11 of the present invention for connecting a pair of pipes 12a, 12b in an end-to-end manner. Each of the pipes 12 (FIGS. 1-2) includes a male sub 13 formed on one end of the pipe and a radial outward extending flange 17 (FIGS. 1, 4) formed on the other end. The male sub 13 includes a radial outward extending flange 18 having a sloping portion 19 and a flat portion 20. A radially enlarged portion 24 of the pipe 12 is adjacent the flange 18.

A split female sub 25 includes a pair of annular sections 25a, 25b having a axially extending bore 26 (FIG. 4) adapted to fit about the pipe 12. A larger portion 27 of the female sub contains an axial bore 28 adapted to fit about the radial flange 17 and the sections 25a, 25b are secured about flange 17 by a snap ring 31 in an annular groove 32. A pair of slots 34 (FIGS. 3, 4) in the female sub 25 receive a pair of ears 35 on the pipe 12 and prevent the female sub from rotating about the pipe when the joint connects or disconnects the pipes 12a, 12b. The larger portion 27 of the female sub includes an externally threaded portion 33 adapted to mate with a set of internal threads 37 (FIGS. 1, 2) of a wing union nut 38.

The wing nut 38 includes a relatively large threaded axial bore 39 (FIG. 2) extending through a portion of the nut and a smaller axial bore 40 extending through a remaining portion of the nut 38. A plurality of wings 44 (FIGS. 1, 2) for use in rotating the nut 38 extend radially outward from the nut. A hammer or other striking instrument can be used to strike the wings 44 causing the nut to rotate.

Figure 2:
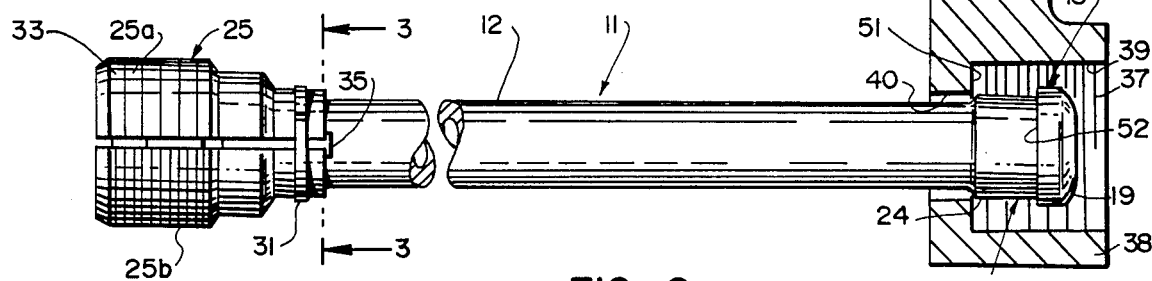
FIG. 2 is a side elevation of a pup joint of the present invention with parts broken away.
Figure 3:
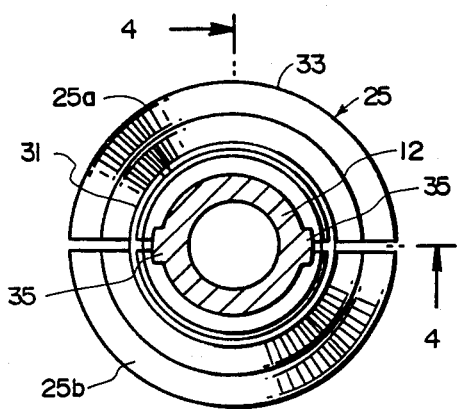
FIG. 3 is a sectional view taken along line 3—3 of FIG. 2.

The pup joint 11 is assembled by first moving the union nut 38 (FIGS. 1, 2) over the flange 17 (FIG. 4), with the female sub 25 removed from the pipe 12, to a position which places the nut 38 about the male sub 13 as shown in FIG. 2. The two halves of the female sub 25 are then placed over the flange 17 (FIGS. 2, 4) with the ears 35 of the pipe 12 in the slots 34. The snap ring 31 is then placed in the groove 32 to secure the female sub about the flange 17. An annular sealing ring 45 (FIGS. 1, 4) having an elastomeric portion 46 and a metal portion 47 is placed inside the bore 28 adjacent the flange 17 of the pipe 12a. The male sub 13 of the pipe 12b is then placed against the sealing ring 45 and the nut 38 is threaded onto the female sub 25 to draw the male sub 13 firmly against the sealing ring 45. A shoulder 51 (FIG. 2) on the union nut 38 presses against a surface 52 on the male sub 13 to compress the ring 45 between the male sub 13 of pipe 12b (FIG. 1) and flange 17 of pipe 12a to provide a tight seal. The sloping portion 19 (FIGS. 1, 2) of the male sub 13 presses against a sloping portion 53 of the female sub 25 (FIGS. 1, 4) to force the portion 27 (FIG. 4) radially outward and provides a locking effect between the female sub 25 and the union nut 38.

The present invention provides a simple joint by including a pipe as a part of the joint. One end of each pipe is enlarged to form a male sub and the other end of each pipe forms a flange to which the female sub is secured. There are no welds or threaded connection between the pipe and the male or female subs which results in a joint which is relatively inexpensive and easy to construct.

Although the best mode contemplated for carrying out the present invention has been herein shown and described, it will be apparent that modification and variation may be made without departing from what is regarded to be the subject matter of the invention.

What is claimed is:

1. A pup joint for interconnecting lengths of oilwell service pipe in an end-to-end relationship, said joint comprising:

first and second lengths of pipe each having a first annular flange extending radially outward from a first end of each of said pipes and a second annular flange extending radially outward from a second end of each of said pipes, said first annular flange having a smaller radial size than said second annular flange;

a one-piece union nut having a large internally threaded bore extending axially along a portion of said union nut, said union nut having a smaller bore extending axially along a remaining portion of said union nut, said smaller bore having a larger radial size than said first annular flange on said pipes and having a smaller radial size than said second annular flange, so said union nut can be moved over said first annular flange and positioned with said internally threaded bore about said second annular flange;

an annular female sub having an externally threaded portion extending axially along a portion of said female sub, said female sub having a first bore extending axially along a portion of said sub and a smaller bore extending axially along a remaining portion of said female sub, said female sub including at least two axially extending sections;

a snap ring extending about said sections of said female sub to retain said female sub about said pipe with said first bore of said female sub about said first annular flange on said pipe and with said smaller bore of said female bore about said pipe adjacent said first annular flange; and an annular sealing ring mounted inside said first bore of said female sub to seal a junction between a first end of a first pipe and said second annular flange of a second pipe when said union nut about said second pipe is threaded onto said female sub on said first pipe.

2. A pup joint as defined in claim 1 wherein said externally threaded portion of said female sub about a first pipe is mated to said internally threaded bore of said union nut mounted about a second pipe, said union nut pressing said second annular flange on said second pipe against said first annular flange on said first pipe as said union nut is threaded onto said female sub.

3. A pup joint as defined in claim 1 including an ear on said first pipe adjacent said first annular flange and a slot in said female sub, said slot being adapted to receive said ear to prevent rotation of said female sub relative to said first pipe as said union nut is threaded onto said female sub.

* * * * *